United States Patent Office 3,173,447
Patented Mar. 16, 1965

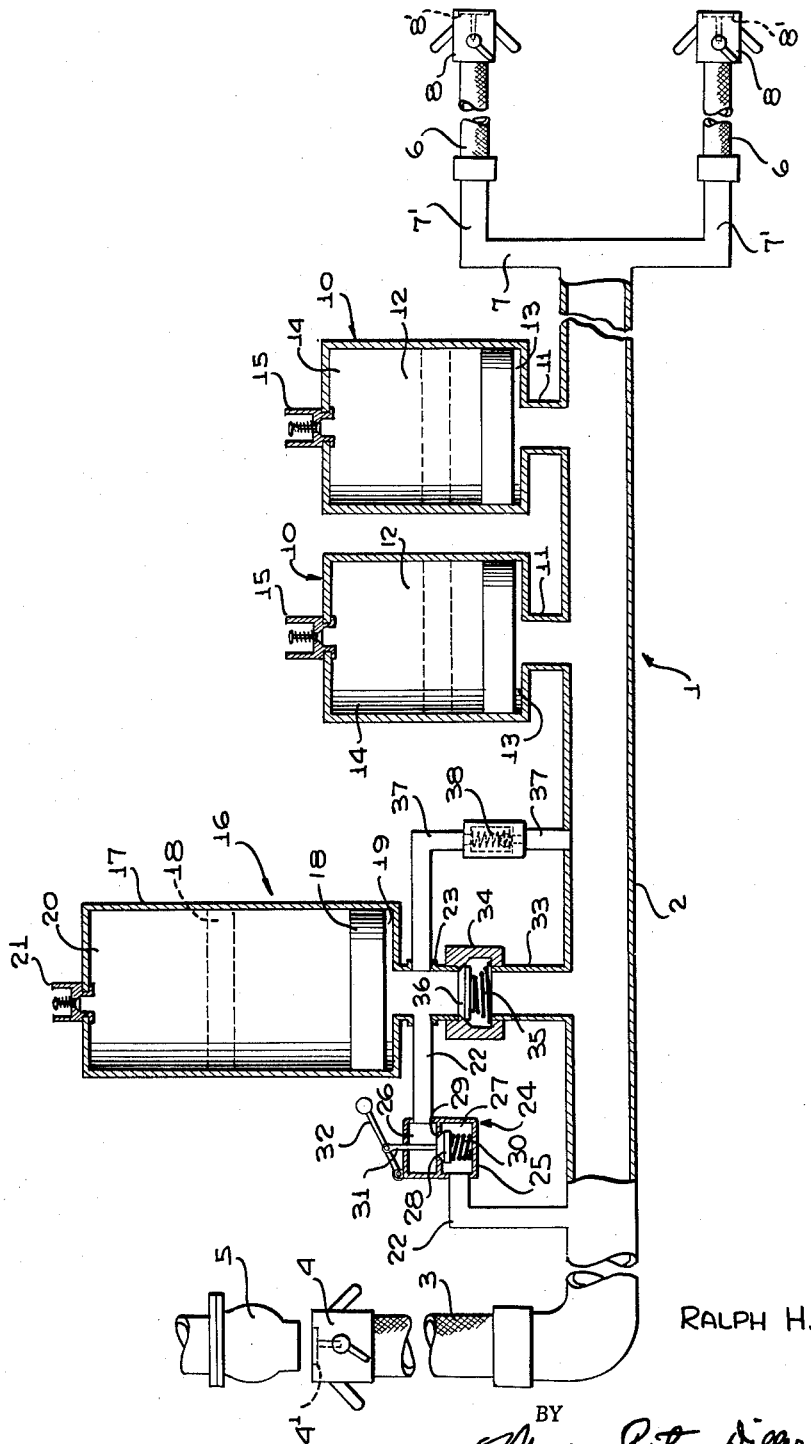

3,173,447
PRESSURE REFUELING SYSTEM
Ralph H. Lebow, Pacific Palisades, Calif., assignor to Parker-Hannifin Corporation, Cleveland, Ohio, a corporation of Ohio
Filed May 21, 1962, Ser. No. 196,298
15 Claims. (Cl. 137—593)

This invention relates to a pressure bleed-off system, and more particularly to a pressure bleed-off system for use with a hydrant type fuel servicer employed in the refuelling of airplanes and the like.

In a hydrant type fueling system at airports, fuel is stored in an underground tank and is available at a hydrant connected to the tank. A fuel servicer unit, usually mounted on a vehicle, has a main line, control valves for the main line, and hoses connected to the main line. A hose at one end of the latter has a coupler for attachment to a pressure control valve at the hydrant. A hose at the other end of the main line has a nozzle for connection to the tank of the airplane. Both the couplers and nozzles have valves therein for closing the same.

In such systems it is desirous to maintain a regulated fuel pressure at the hose nozzles so as to supply fuel to the receiving tanks at a predetermined rate. When the receiving tanks have been filled to the desired level, valves within the tanks close and thereby stop the flow of fuel from the hydrant through the servicer and into the particular receiving tank. Immediately thereafter the pressure control valve at the hydrant closes and fuel becomes locked within the main line and hoses. It is apparent that upon such closing of the tank and pressure control valves the fuel locked in the system between such valves is under a pressure at least equal to that necessary in maintaining the predetermined rate of fuel flow into the receiving tank. However, to this pressure of the locked-in fuel, an additional or surge pressure is imposed due to sudden stoppage of fuel flow when the tank valves close. Therefore, it is not unusual to have locked-in fuel pressures within the main line and the hoses equal to twice that of the pressure necessary to maintain the preselected fuel flow rate.

For example, if the preselected regulated fueling pressure is from 35 to 50 pounds per square inch a locked-in fuel pressure of 80 pounds per square inch is not unusual after the tank valves have closed. These undesirably high locked-in pressures remain in the hoses and main line when the valves in the coupler and nozzles are later closed so that the hoses may be detached from the hydrant and aircraft without spillage of fuel and impede the reeling and handling of the fuel hoses. Thus they should be eliminated or reduced to a level which allows facile handling of the fuel hoses.

The problem of locked-in pressure adversely affecting the handling of hoses mounted on a tank truck refueler may be eliminated by adding a small bleed line from the discharge hoses or the main line back into the main tank. However, in a hydrant system the reservoir or main tank is not accessible for connecting such a bleed line thereto.

One known way of bleeding off undesirably high locked-in pressures within a hydrant system is to provide a special reservoir tank of from 20 to 30 gallons capacity, which tank is mounted upon the servicer itself. The outlet of this special tank is then connected to the throat of an eductor mounted in a separate fuel line parallel to the main fuel line which, when operating so as to direct fuel into a receiving tank, will remove fuel from this special tank and act so as to create a partial vacuum in said special tank. Whenever the vacuum in the special tank drops to a predetermined value, a three-way valve is caused to actuate a butterfly valve installed within the main fuel line. The butterfly valve then closes off the main fuel line and diverts fuel flow through the parallel line containing the eductor moving fuel from the special tank. The vacuum within the special tank then increases to a value at which the butterfly valve is actuated by the three-way valve to its normally open position and the fuel continues to flow through the main fuel line and into the receiving tank. In this manner a satisfactorily regulated fueling pressure is maintained at all times within the main fuel line. This known system, however utilizes several components and thus not only increases its vulnerability to failure, but furthermore increases the total expense of hydrant servicers provided with such a system. Also, on hydrant servicers of this known type, available space on the servicer is generally at a minimum and it is, therefore, very important and highly desirable to provide a system for reducing or eliminating locked-in pressure which takes as little space as possible on the servicer. It is also highly desirable to satisfactorily bleed off locked-in fuel pressure at the lowest cost possible and to utilize in the system components which operate simply and efficiently and thus reduce to a minimum the possibility of the system failing.

It is, therefore, an object of the invention to provide, for use with a hydrant type fuel servicer, a novel, simply constructed and inexpensive system for bleeding off undesirably high locked-in pressure, which bleed-off system occupies a minimum amount of space on the servicer.

Another object of the invention is the provision of a system constructed of conventionally produced components arranged on a hydrant type fuel servicer to bleed off fuel under undesirably high pressure within the main line and attached hoses caused by the sequential closing of the receiving tank valves and a pressure control valve at the hydrant in a manner whereby the pressure within the hoses is reduced to a level at which the hoses may be easily handled and reeled for storage upon the completion of a fueling operation.

A further object of the invention is the provision of a bleed-off system for use with a hydrant fuel servicer of the type having a main line and a hose connected to the main line for distributing fuel to a receiving tank, said system including an accumulator, a first line connecting the accumulator to the main line, a first valve in the first line for allowing pressurized fuel locked in the main line and hose system to bleed off into the accumulator, a second line also connecting the accumulator to a different sector of the main line, and a second valve in the second line to permit flow of fuel from the accumulator to the main line when the pressure in the accumulator exceeds that of the main line.

With the above and other objects in view, that will appear hereinafter, the nature of the invention will be more clearly understood by reference to the following detailed description and the accompanying drawing.

In the drawing, the single figure illustrates the pressure bleed-off system of the invention as disposed upon a hydrant fuel servicer suitable for the refueling of fuel receiving tanks such as those mounted in airplanes.

In the diagrammatic illustration there is shown a portion of a hydrant type fuel servicer 1. The servicer 1 has a fuel supply conduit which includes a main fuel line 2 having at one end a hose 3 with a coupler 4 thereon for connection to a pressure control valve 5 of the hydrant type fuel storage system and having at its other end a pair of hoses 6 connected thereto by a T connection 7. At the end of each hose 6 is a delivery nozzle 8 having a manually openable and closable valve 8' therein. Two or more hoses 6 may be provided but alternately only one fuel hose 6 may be connected to the main fuel line 2. Nozzles 8 are for connection to the receiving parts of the tank or tanks adapted to receive the fuel, such as those mounted in airplane wings.

In the operation of the hydrant system fuel from the hydrant passes through pressure control valve 5 and coupler 4 into main fuel line 2. Fuel then enters the T connection 7 and passes through legs 7' into hoses 6 and then through nozzles 8 into the receiving tanks to fill them to the desired level. When this level has been reached valves within the receiving tanks are automatically shut off in a manner well known in the art. Immediately thereafter the pressure control valve 5 closes to prevent further delivery of fuel into the main fuel line 2. Nozzle valves 8' and coupler valve 4' may then be closed so that the coupler and nozzles may be detached from valve 5 and the aircraft tanks respectively.

It is desirable that the flow of fluid along the main fuel line 2 be maintained at a predetermined constant pressure by valve 5 and suitable controls, not shown, are provided for doing this. A normal but merely illustrative pressure range would be from 35 to 50 pounds per square inch.

In order to minimize surges in the pressure of the fuel within the main fuel line 2, the main fuel line 2 intermediate the T connection 7 and hose 3 is provided with one or more surge suppressors 10. Each surge suppressor is connected to the main line 2 through a suitable line 11, said line being conventionally coupled into the main line 2. Each surge suppressor 10 may be cylindrical with a piston 12 mounted for movement therein along its longitudinal axis. Its piston 12 divides each surge suppressor 10 into a first chamber 13 and a second chamber 14. The second chamber 14 is precharged with a compressible fluid, such as air, through a suitable valve 15. Each said chamber 14 may be charged with air through valve 15 by means of a suitable pump or other conventional compressor apparatus. In the particular embodiment illustrated, each surge suppressor 10 has a maximum capacity of 5 gallons of fuel and the second chamber 14 is precharged to a pressure approximately that of the normal main line operating pressure, e.g. in the range of 35–50 pounds per square inch.

The hydrant servicer 2 is further provided with a bleed-off means generally designated 16 which is incorporated therein so as to reduce the pressure at which locked-in fuel will be maintained in the system; it being obvious that even under the most desirable operating conditions of the hydrant servicer, there will be a locked-in fuel pressure of 35 to 50 pounds within the main fuel line 2 and the hoses 3 and 6. However, under actual operating conditions, as the receiving tank valves automatically close prior to closing of valve 5, there will be a pressure build-up of the locked-in fuel above that of the normal operating fuel line pressures. For the particular system illustrated, this increase of locked-in fuel pressure has been observed to commonly be in the vicinity of 80 pounds p.s.i. This increased pressure in main line 2 causes fuel in the latter to flow into surge suppressors 10 to raise pistons 12 and further compress the air above the pistons until the pressure of such air is the same as the increased fuel pressure in line 2.

The problem of hose handling and reeling upon the completion of a fueling cycle becomes increasingly difficult with increases of pressure of the locked-in fuel. Therefore, it is highly desirable to provide a means by which the pressure of this locked-in fuel can be substantially reduced so as to facilitate the handling of the hoses 3 and 6.

The bleed-off means generally designated 16 comprises an accumulator 17 which is conveniently mounted upon the servicer and is also connected to the main fuel line 2 intermediate hoses 3 and 6. The particular accumulator 17 disclosed is of approximately 10 gallon capacity and is provided with a reciprocable piston 18 which serves as a movable wall to divide the accumulator into a first chamber 19 and a second chamber 20. The accumulator 17 may be of construction similar to the surge suppressors 10 and is also provided with a valve 21, similar to previously mentioned valves 15, for admitting a compressible fluid, such as air, to the upper chamber 20 of the accumulator 17. With the particular operating pressures involved in the illustrative embodiment, a precharged fluid pressure within the second or upper chamber 20 of 5 to 7 pounds per square inch has been found desirable.

A first line 22 runs from the main fuel line 2 to a standard four-way connector 23 which is, in turn, connected to the accumulator 17 so as to communicate directly with chamber 19 thereof. Mounted in line 22 is a valve 24 normally closed by a spring 30. Valve 24 has a body 25 with two chambers 26 and 27. A valve member 28 is normally held against a seat 29 which separates the chambers 26 and 27 from each other. The normal disposition of the valve member 28 against its seat is maintained by spring element 30 interposed between the valve member 28 and the bottom of the lower chamber 27. A valve rod 31 is connected to the valve member 28 and to a handle 32 so that when the handle 32 is pressed downward the valve will be opened to permit fuel locked within the main fuel line 2 to flow through the line 22 and into the accumulator 17. As this happens the piston 18 will move up into the accumulator 17 thus enlarging the chamber 19 and reducing the chamber 20 so as to increase the pressure of the compressible fluid within chamber 20. The locked-in fuel within the hoses 3 and 8 and main fuel line 2 may then continue to bleed off through the line 22 into the accumulator 17 until the fluid pressures on both sides of piston 18 are equalized.

It has been found that a system utilizing the previous illustrative pressure figures and subjected to a locked-in pressure of 80 pounds per square inch will quickly bleed down to a pressure equilibrium or residual pressure of 12 pounds per square inch within both chambers of the accumulator, the main fuel line and the hoses 3 and 8. At this lowered pressure, the hoses 3 and 8 are easily manipulated and reeled back into position on the servicer at the completion of the refueling cycle.

A second line 33 runs from the four-way connection 23 to the main fuel line 2. Disposed in this second line 33 is a check valve 34 of the unidirectional type, that is to say, that fuel at a higher pressure on the main line side of the check valve 34 than on the accumulator side of the check valve 34 will force the valve to a closed position. The valve 34 is maintained in a normally closed position by the action of its spring member 35 set at a predetermined opening pressure upon its valve member 36.

A third line 37 also connects the four-way connection 23 and the main line 2. A thermal relief valve 38 is disposed within the line 37 and serves to protect against over pressurization of main line 2 by passing fluid from line 2 into accumulator chamber 19 when the pressure in line 2 reaches a predetermined value.

The overall operation of the hydrant type fuel servicer 5 having the disclosed bleed-off system 16 attached thereto is as follows: fuel under pressure from the hydrant storage tank is permitted to flow through pressure control valve 5 into hose 3 and main line 2 upon opening of valve 5. The fuel flowing along main line 2 and subsequently into hoses 6 and through hose nozzles 8 into the receiving tanks is maintained at a predetermined pressure by pressure control valve 5. While the receiving tanks are being filled, the positions of the pistons and valves are as shown by the solid lines in the drawing.

When the receiving tanks have been filled to the desired level the receiving tank valves are automatically shut off by floats or other well known means, at which time the fuel pressure in line 2 will rise and fuel will be forced into surge suppressors 10 to raise pistons 12 to the positions shown by dotted lines. At the same time, or promptly thereafter, valve 5 is deactivated by a means not shown so as to cut off the flow of fuel into main line 2 from the hydrant. Arm 32 of valve 24 may then be depressed so as to allow fuel locked in under pressure within the main line 2 and the hoses 3 and 8 to bleed-off into accumulator 17. During such bleed-off piston 18 rises in accumulator 17, compresses the compressible fluid within the chamber 20. Meanwhile, pistons 12 of surge suppressors 10 return to their full line position as they force fluid from the suppressors into line 2.

When the pressures within the accumulator 17, main line 2, and surge suppressors 10 have been equalized, actuating arm 32 of the valve 24 is released so as to shut off the connection therethrough of main line 2 with accumulator 17. The pressure of fluid within main line 2 and hoses 3 and 8 will now be substantially lower so that the hoses may be readily manipulated.

When it is desired to initiate another fueling operation, coupler 4 and nozzles 8 are attached to valve 5 and the aircraft tanks respectively and valves 4' and 8' are opened. Since the aircraft fuel tanks are not pressurized opening of nozzle valves 8' drops the residual pressure in main line 2. This causes check valve 36 to open and the pressure of fluid in chamber 20 forces piston 18 downward to the full line position, fuel from chamber 19 being forced through check valve 34 into main line 2. An equivalent amount of fuel so displaced from chamber 19 will be forced through nozzle 8' into the tanks. Since the latter are vented, the pressure of fuel remaining within main line 2 will be at an equivalent low vent pressure. Valve 5 may then be opened to perform another fueling operation.

It is to be understood that the specific examples of pressures given in the disclosure herein are not meant to be restrictive, and that the invention may be practiced within the scope of the appended claims.

What is claimed is:

1. A pressure bleed-off system for use with a hydrant fuel servicer of the type having a supply conduit for connection at one end to a source of fuel and for connection at its other end to a receiving tank; said system comprising an accumulator, a conduit, means for closing said conduit at opposite ends thereof, a first line running from said accumulator to said conduit, a normally closed first valve mounted in said first line and operable for permitting fuel locked in said conduit to bleed-off into said accumulator when said first valve is opened, a second line running from said accumulator to said conduit, and a second valve mounted in said second line, said second valve being a normally closed check valve operable to an open position so as to permit fuel to flow from said accumulator to said conduit only when the fuel pressure in said accumulator exceeds the fuel pressure in said conduit.

2. A pressure bleed-off system for use with a hydrant fuel servicer of the type having a supply conduit for connection at one end to a source of fuel and for connection at its other end to a receiving tank; said system comprising an accumulator, a conduit, a first line running from said accumulator to said conduit, a normally closed first valve mounted in said first line and operable for permitting fuel locked in said conduit to bleed-off into said accumulator when said first valve is opened, a second line running from said accumulator to said conduit, and a second valve mounted in said second line, said second valve being a normally closed check valve operable to an open position so as to permit fuel to flow from said accumulator to said conduit only when the fuel pressure in said accumulator exceeds the fuel pressure in said conduit, a housing with a movable wall forming first and second chambers on opposite sides thereof, said first chamber being connected to said first line for receiving fuel from said first line, and said second chamber being precharged with a pressurized gaseous material.

3. A pressure bleed-off system for use with a hydrant fuel servicer of the type having a supply conduit for connection at one end to a source of fuel and for connection at its other end to a receiving tank; said system comprising an accumulator, a conduit, a first line running from said accumulator to said conduit, a normally closed first valve mounted in said first line and operable for permitting fuel locked in said conduit to bleed-off into said accumulator when said first valve is opened, a second line running from said accumulator to said conduit, and a second valve mounted in said second line, said second valve being a normally closed check valve operable to an open position so as to permit fuel to flow from said accumulator to said conduit only when the fuel pressure in said accumulator exceeds the fuel pressure in said conduit, said conduit having valves at each end thereof which when closed lock fuel in said conduit.

4. A pressure bleed-off system for use with a hydrant fuel servicer of the type having a supply conduit for connection at one end to a source of fuel and for connection at its other end to a receiving tank; said system comprising an accumulator, a conduit, a first line running from said accumulator to said conduit, a normally closed first valve mounted in said first line and operable for permitting fuel locked in said conduit to bleed-off into said accumulator when said first valve is opened, a second line running from said accumulator to said conduit, and a second valve mounted in said second line, said second valve being a normally closed check valve operable to an open position so as to permit fuel to flow from said accumulator to said conduit only when the fuel pressure in said accumulator exceeds the fuel pressure in said conduit, a third line between said conduit and said accumulator and a relief valve in said third line permitting flow of fluid from said conduit to said accumulator when the pressure in the conduit reaches a predetermined value.

5. The system of claim 2 wherein the precharge pressure of the gaseous material is substantially lower than the normal delivery pressure of fuel within the conduit.

6. The system of claim 4 in which said third line is connected to said first chamber of the accumulator.

7. A pressure bleed-off system for use with a hydrant fuel servicer of the type having a supply conduit for a connection at one end to a source of fuel and for connection at its other end to a receiving tank; said system comprising an accumulator having a first chamber and a second chamber formed by an intermediate member movable within said accumulator, a conduit, a first line running from said first chamber to said conduit, a normally closed first valve mounted in said first line for permitting fuel locked in said conduit to bleed-off into said first chamber when said first valve is opened, a second line running from said first chamber to said conduit, and a second valve mounted in said second line, said second valve being a check valve operable to an open position by fluid pressure in said first chamber to permit fuel to flow from said first chamber to said conduit.

8. A pressure bleed-off system for use with a hydrant fuel servicer of the type having a fuel supply conduit, said system comprising an accumulator having a first and a second chamber formed by an intermediate well movable within said accumulator, a conduit, a first line running from said first chamber to said conduit, a normally closed first valve mounted in said first line for permitting fuel locked in said conduit to bleed-off into said first chamber when said first valve is opened, a second line running from said first chamber to said conduit, a second valve mounted in said second line, said second valve being a check valve operable by pressure of fluid in said first chamber to an open position to permit fuel to flow from said first chamber to said conduit, and a surge suppressor connected to said conduit for evening out the pressure of fuel flow within said conduit.

9. The system of claim 8 in which the surge suppressor has an expansible chamber with a movable wall element, said expansible chamber is in fluid communication with said conduit, and there is a means applying force to said movable wall tending to cause the latter to force fluid from said expansible chamber to said conduit.

10. A pressure bleed-off system for use with a hydrant fuel servicer of the type having a supply conduit for connection at one end to a source of fuel and for connection at its other end to a receiving tank; said system comprising an accumulator, a conduit, a first line running from said accumulator to said conduit, a normally closed first valve mounted in said first line and operable for permitting fuel locked in said conduit to bleed-off into said accumulator when said first valve is opened, a second line running from said accumulator to said conduit, and a second valve mounted in said second line, said second valve being a normally closed check valve operable to an open position so as to permit fuel to flow from said accumulator to said conduit only when the fuel pressure in said accumulator exceeds the fuel pressure in said conduit, and at least one surge suppressor connected to said conduit, said surge suppressor containing a compressible fluid for evening out the pressure in said conduit.

11. The system defined in claim 10 in which the compressible fluid in said surge suppressor is precharged to a pressure substantially the same as the normal delivery pressure of the fuel in said conduit.

12. A pressure bleed-off system for use with a hydrant fuel servicer of the type having a supply conduit for connection at one end to a source of fuel and for connection at its other end to a receiving tank; said system comprising an accumulator, a conduit, a first line running from said accumulator to said conduit, a normally closed first valve mounted in said first line and operable for permitting fuel locked in said conduit to bleed-off into said accumulator when said first valve is opened, a second line running from said accumulator to said conduit, and a second valve mounted in said second line, said second valve being a normally closed check valve operable to an open position so as to permit fuel to flow from said accumulator to said conduit only when the fuel pressure in said accumulator exceeds the fuel pressure in said conduit, said accumulator comprising a housing having a movable wall dividing said accumulator into a first chamber and second chamber, said first chamber being connected to said first line and adapted for receiving fuel from said first line, and said second chamber being precharged with a pressurized gaseous material, and there also being included a surge suppressor connected to said conduit comprising another housing having a movable wall dividing said another housing into two chambers one of which is connected with the conduit and the other of which has trapped therein a compressible fluid.

13. A pressure bleed-off system for use with a hydrant fuel servicer of the type having a supply conduit for connection at one end to a source of fuel and for connection at its other end to a receiving tank; said system comprising an accumulator, a conduit, a first line running from said accumulator to said conduit, a normally closed first valve mounted in said first line and operable for permitting fuel locked in said conduit to bleed-off into said accumulator when said first valve is opened, a second line running from said accumulator to said conduit, and a second valve mounted in said second line, said second valve being a normally closed check valve operable to an open position so as to permit fuel to flow from said accumulator to said conduit only when the fuel pressure in said accumulator exceeds the fuel pressure in said conduit, said accumulator being of the cylindrical type having a piston mounted therein for movement therealong and dividing said accumulator into a first chamber and second chamber, said first chamber being connected to said first line and adapted for receiving fuel from said first line, and said second chamber being precharged with a pressurized gaseous material, and there also being included a surge suppressor connected to said conduit and comprising a cylinder having a reciprocable free piston therein dividing the cylinder into two chambers one of which is connected with the conduit and the other of which has trapped therein a compressible fluid under pressure, and means for introducing into and retaining in the last named other chamber said compressible fluid.

14. A pressure bleed-off system for a closed conduit comprising; a conduit, means for closing said conduit at opposite ends thereof a housing having a movable wall forming an expansible chamber within said housing, means for selectively directing fluid from said conduit to said chamber, and means for automatically returning fluid from said chamber to said conduit when the pressure of fluid in said chamber is greater than the pressure of fluid within said conduit.

15. The pressure bleed-off system of claim 14 in which said fluid in said chamber acts on one side of said wall and in which said returning means includes a means for applying force to the other side of said movable wall whereby said wall moves fluid from said chamber to said conduit when said force is greater than the force of said fluid acting on said wall.

References Cited in the file of this patent
UNITED STATES PATENTS
2,620,825    Cannon _____ Dec. 9, 1952

FOREIGN PATENTS
437,932    Italy _____ July 20, 1948